(12) United States Patent
Doi

(10) Patent No.: US 8,319,794 B2
(45) Date of Patent: Nov. 27, 2012

(54) IMAGE DISPLAY CONTROL APPARATUS, METHOD FOR CONTROLLING THE SAME, AND PROGRAM

(75) Inventor: Nobuhiro Doi, Chiba (JP)

(73) Assignee: Sony Corporation, Tokyo (JP)

( * ) Notice: Subject to any disclaimer, the term of this patent is extended or adjusted under 35 U.S.C. 154(b) by 1120 days.

(21) Appl. No.: 12/203,481

(22) Filed: Sep. 3, 2008

(65) Prior Publication Data

US 2009/0102750 A1    Apr. 23, 2009

(30) Foreign Application Priority Data

Oct. 19, 2007  (JP) ................. 2007-272112

(51) Int. Cl.
*G09G 5/00*    (2006.01)
(52) U.S. Cl. .......... 345/626; 345/55; 345/563; 345/619; 345/625
(58) Field of Classification Search .............. 345/55–92, 345/563, 626
See application file for complete search history.

(56) References Cited

U.S. PATENT DOCUMENTS

| | | | |
|---|---|---|---|
| 7,714,881 B2 * | 5/2010 | Kimpe | 345/690 |
| 8,094,143 B2 * | 1/2012 | Kamada et al. | 345/204 |
| 2004/0189649 A1 * | 9/2004 | Nakatsuka et al. | 345/501 |
| 2005/0219620 A1 * | 10/2005 | Ohshita | 358/3.01 |

FOREIGN PATENT DOCUMENTS

| | | |
|---|---|---|
| JP | 5-244496 | 9/1993 |
| JP | 2002-237987 | 8/2002 |
| JP | 2002-262175 | 9/2002 |
| JP | 2004-228821 | 8/2004 |
| JP | 2005-142707 | 6/2005 |

* cited by examiner

*Primary Examiner* — Xiao M. Wu
*Assistant Examiner* — Todd Buttram
(74) *Attorney, Agent, or Firm* — Oblon, Spivak, McClelland, Maier & Neustadt, L.L.P.

(57) ABSTRACT

An image display control apparatus includes an image data supply section that supplies an image composed of a plurality of pixels arranged two-dimensionally in a matrix form as captured image data, a mask data supply section that supplies mask data for masking the image data, an imaging instruction accepting section that validates an imaging instruction acceptance signal when accepting an operation input corresponding to an imaging instruction, and a drawing section that sequentially draws the respective pixels, each having a pixel value, in the image data every predetermined period. When detecting that the imaging instruction acceptance signal is valid, the drawing section draws the pixels such that each pixel has a value including the mask data as the pixel value after the detection.

10 Claims, 20 Drawing Sheets

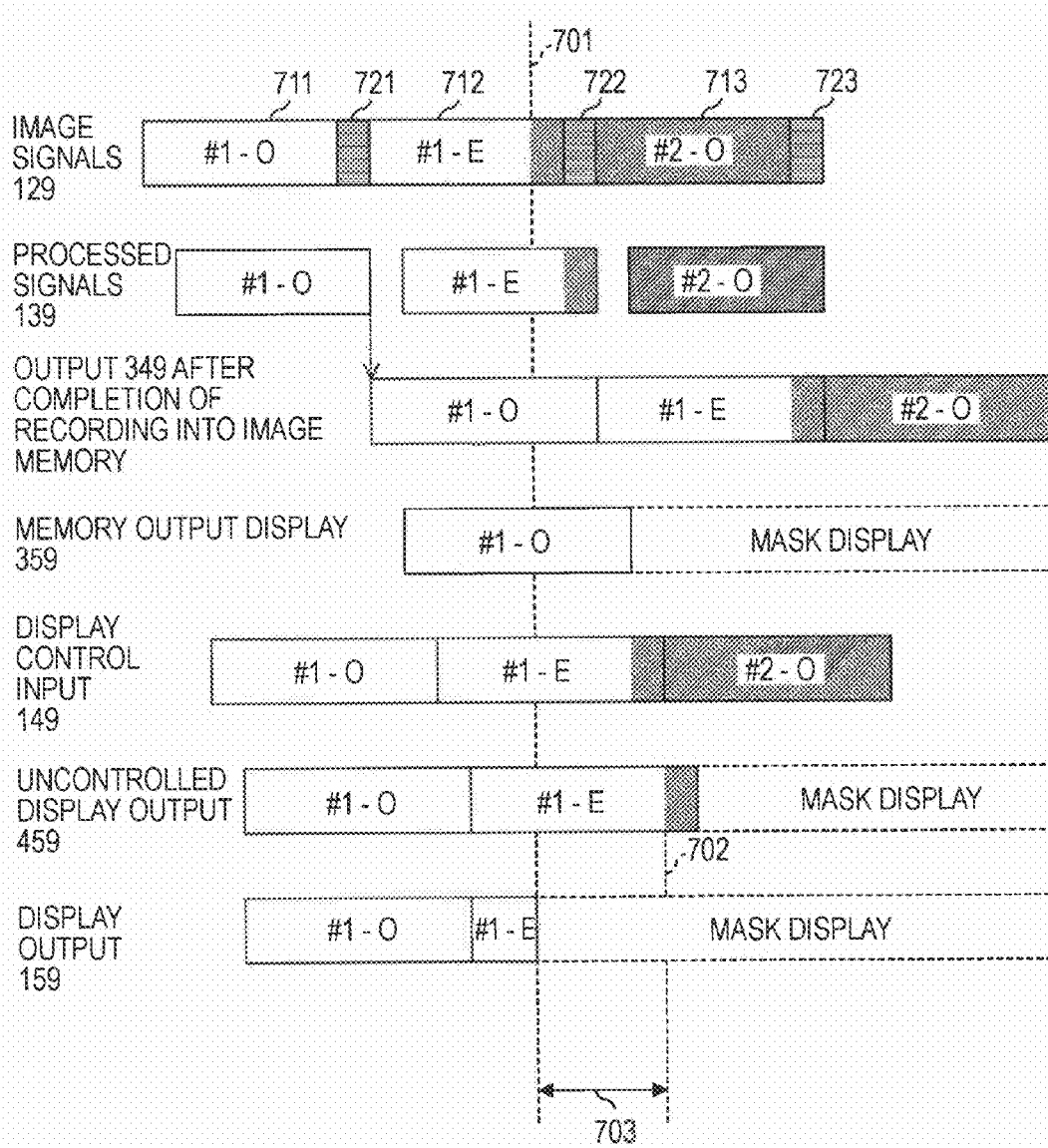

IMAGE DISPLAY CONTROL APPARATUS, METHOD FOR CONTROLLING THE SAME, AND PROGRAM

CROSS REFERENCES TO RELATED APPLICATIONS

The present invention contains subject matter related to Japanese Patent Application JP 2007-272112 filed in the Japanese Patent Office on Oct. 19, 2007, the entire contents of which are incorporated herein by reference.

BACKGROUND OF THE INVENTION

1. Field of the Invention

The present invention relates to image display control apparatuses, and in particular, relates to an image display control apparatus for performing display control when allowing a display to display a captured image, a method for controlling the image display control apparatus, and a program that allows a computer to perform the method.

2. Description of the Related Art

In an imaging apparatus such as a digital still camera, an image captured through an image sensor, e.g., a charged coupled device (CCD) or a complementary metal oxide semiconductor (CMOS) sensor, is displayed on a liquid crystal display (LCD) or an electronic view finder (EVF). Many of recent imaging apparatuses include no optical view finder. In many cases, the composition of a subject is determined on the basis of display on an LCD or an EVF.

In this case, there is a time lag between an image that a user intends to capture and an image that is actually recorded after the user presses a shutter release. Specifically, it takes time corresponding to the length of circuitry in the imaging apparatus after the user recognizes a subject and presses the shutter release until the image sensor exposes an image. In the case where the composition of the subject is determined on the basis of display on the LCD or EVF, time taken after the image begins to be exposed until the image is displayed on the LCD or EVF is further added to the above-described time. Therefore, a reduction in the above-described time lag is very important to provide a user-friendly imaging apparatus.

According to one of related-art techniques for realizing high-speed monitor display, for example, when the operation mode is alternately switched between a still image mode (still mode) and a moving image mode (monitoring mode), higher priority is given to the moving image mode in order to reduce a delay in monitor display during continuous shooting. For example, Japanese Unexamined Patent Application Publication No. 2005-142707 discloses such a technique.

SUMMARY OF THE INVENTION

Imaging apparatuses generally include an image memory for storing image data corresponding to an image captured by an image sensor. The image data is read from the image memory and the image is displayed on a display. In general, after image data of one frame (or one field) to be displayed is written into the image memory, the image data is read from the image memory.

When a shutter release is pressed, the operation mode of the image sensor is switched, so that the transfer rate of image data is changed. Accordingly, the image data may be distorted. If image data is read from the image memory while the data is being written into the image memory, the image data distorted upon pressing the shutter release is output as it is distorted. If image data is read from the image memory after completion of writing of the image data in order to prevent the image data from being distorted, a time lag in display is lengthened.

Furthermore, in some optical systems, the order in which image data is written into an image memory differs from the order in which the image data is displayed. Accordingly, if image data is read from the image memory while is being written into the image memory, an unnatural image may be displayed.

It is desirable to reduce a time lag in display while preventing distortion of an image.

The present invention has been made to solve the above-described problems. According to a first embodiment of the present invention, there is provided an image display control apparatus including image data supply means for supplying an image composed of a plurality of pixels arranged two-dimensionally in a matrix form as captured image data, mask data supply means for supplying mask data for masking the image data, imaging instruction accepting means for validating an imaging instruction acceptance signal when accepting an operation input corresponding to an imaging instruction, and drawing means for sequentially drawing the respective pixels, each having a pixel value, in the image data every predetermined period. When detecting that the imaging instruction acceptance signal is valid, the drawing means draws the pixels such that each pixel has a value including the mask data as the pixel value after the detection.

According to a second embodiment of the present invention, there is provided a method for controlling image display in the image display control apparatus.

According to a third embodiment of the present invention, there is provided a program that allows a computer to perform the method in the image display control apparatus.

According to each of the above-described embodiments, advantageously, the pixels are drawn such that each pixel has a value including the mask data as the pixel value after it is detected that the imaging instruction acceptance signal is valid.

In the first embodiment, when detecting that the imaging instruction acceptance signal is valid, the drawing means may draw the pixels having pixel values mixed with the mask data so that the pixel values of the pixels are gradually changed to the mask data during a predetermined segment after the detection. Advantageously, transition to the mask data can be naturally displayed.

In the first embodiment, upon displaying a new image after detecting that the imaging instruction acceptance signal is valid, the drawing means may draw the mask data as the pixels each having a pixel value. Advantageously, the mask data can be displayed without being mixed with the pixel values upon displaying a new image before transition to the mask data.

In the first embodiment, when detecting that the imaging instruction acceptance signal is valid, the drawing means may draw the mask data as the pixels each having a pixel value after the detection. Advantageously, the mask data can be drawn as the pixels each having a pixel value after it is detected that the imaging instruction acceptance signal is valid.

In the first embodiment, the drawing means may perform the detecting operation each time drawing a set of pixels continuously arranged in one direction in the arrangement is finished. Advantageously, whether the imaging instruction acceptance signal is valid is determined every line, so that pixels having a value including the mask data can be drawn in line units.

In the first embodiment, the drawing means may perform the detecting operation each time drawing one pixel in the arrangement is finished. Advantageously, whether the imaging instruction acceptance signal is valid is determined every pixel, so that a pixel having a value including the mask data can be drawn in pixel units.

In the first embodiment, the drawing means may draw the pixels in the vertical direction such that the direction in which the pixels are drawn is the same as the scanning direction on a display surface of a display to be controlled. Advantageously, pixels can be drawn in the direction appropriate to the properties of an optical system.

In the first embodiment, the mask data may contain color information and transmittance. Advantageously, the image data can be displayed so as to be naturally changed to the mask data.

The embodiments of the present invention have the excellent advantages in that a display time lag in the imaging apparatus can be reduced while distortion of an image is being prevented.

BRIEF DESCRIPTION OF THE DRAWINGS

FIG. 3 is a timing diagram illustrating an operation of the imaging apparatus 100 according to the embodiment of the present invention;

DESCRIPTION OF THE PREFERRED EMBODIMENTS

An embodiment of the present invention will be described in detail with reference to the drawings.

Figure 1:
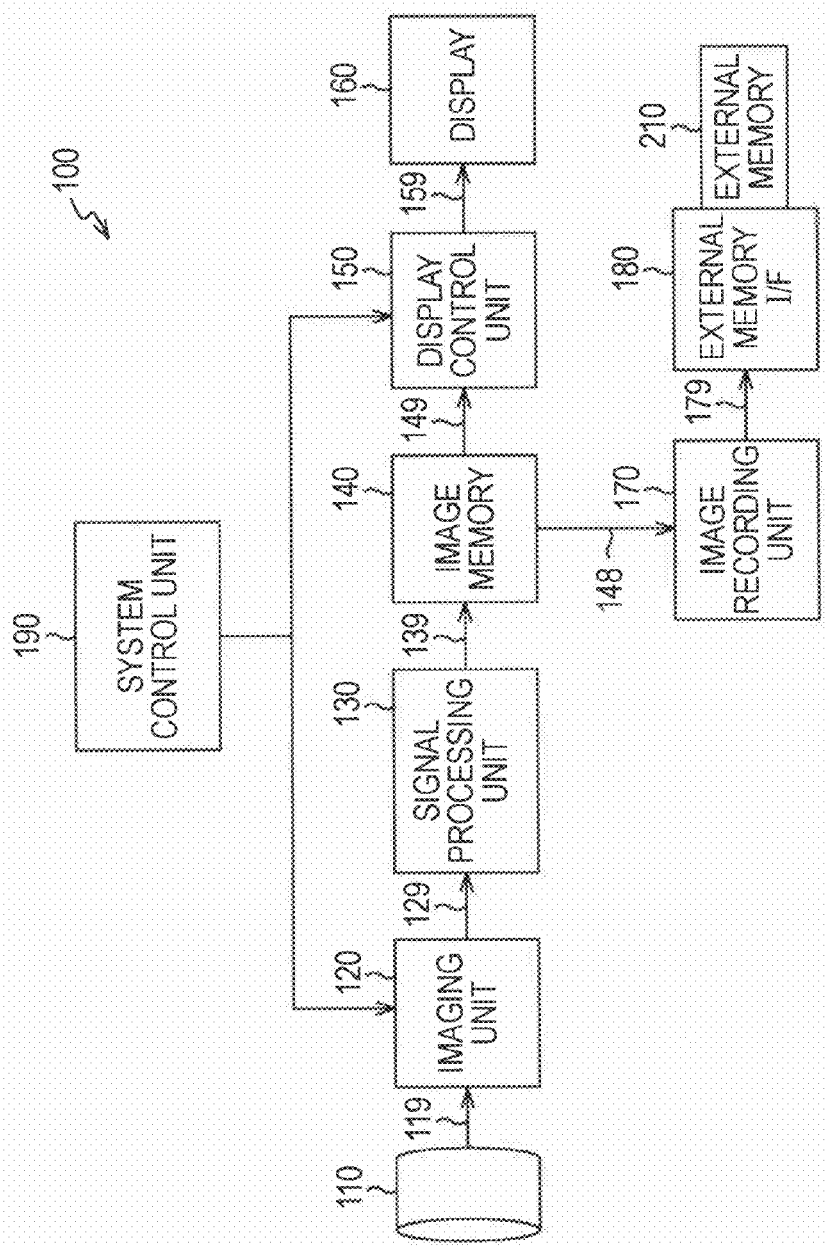
FIG. 1 is a block diagram illustrating the structure of an imaging apparatus 100 according to an embodiment of the present invention.

FIG. 1 is a diagram illustrating the structure of an imaging apparatus 100 according to an embodiment of the present invention. The imaging apparatus 100 includes a lens unit 110, an imaging unit 120, a signal processing unit 130, an image memory 140, a display control unit 150, a display 160, an image recording unit 170, an external memory interface (I/F) 180, and a system control unit 190.

The lens unit 110 is an optical unit configured to guide light reflected from a subject to the light receiving surface of the imaging unit 120 and includes a group of lenses, such as a focusing lens and a zoom lens, an iris, and a driver that drives those lenses. The lens unit 110 forms a subject image corresponding to the light, passing through an optical path 119, on the light receiving surface of the imaging unit 120.

The imaging unit 120 is configured to convert light supplied from the lens unit 110 into an electrical signal and transfer the signal as a captured image signal to the signal processing unit 130 via a signal line 129. The imaging unit 120 changes a transfer rate and an operation mode associated with a resolution in accordance with instructions supplied from the system control unit 190.

The signal processing unit 130 is configured to receive a captured image signal transferred from the imaging unit 120 and perform predetermined signal processing on the received signal. The signal processing unit 130 converts the image signal from analog to digital form and performs the signal processing, such as white balance correction, gamma correction, enlargement, and reduction, on the signal. The signal processing unit 130 outputs the resultant image signal as captured image data to the image memory 140 via a signal line 139.

The image memory 140 is configured to store captured image data subjected to signal processing. The image data stored in the image memory 140 is supplied to the display control unit 150 via a signal line 149 and is also supplied to the image recording unit 170 via a signal line 148. Captured image data is composed of a plurality of pixels arranged two-dimensionally in a matrix form. Each set of pixels arranged in the horizontal direction is called a row or a line. The position of a pixel in each line is called a column.

The display control unit 150 is configured to read image data from the image memory 140 via the signal line 149 and output the read data to the display 160 via a signal line 159. In this embodiment of the present invention, the display control unit 150 reads image data from the image memory 140 without waiting for completion of writing image data of one frame (or one field) to the image memory 140. At that time, the display control unit 150 masks image display in row units or pixel units to prevent distortion of an image. The system control unit 190 controls those timings.

The display 160 displays an image output from the display control unit 150 and includes, for example, a liquid crystal display (LCD). Image display on the display 160 is realized by sequentially scanning the image horizontally from the left upper corner as a start point to the right every row from the top to the bottom.

The image recording unit 170 reads image data from the image memory 140 via the signal line 148 and compresses the data in a predetermined file format, for example, Joint Photographic Experts Group (JPEG). The compressed image data is output to the external memory interface 180 via a signal line 179. The external memory interface 180 is an interface for connecting to an external memory 210. The image data compressed by the image recording unit 170 is recorded into the external memory 210 through the external memory interface 180. The external memory 210 includes, for example, a hard disk or a flash memory.

The system control unit 190 controls the entire imaging apparatus 100. For example, the system control unit 190 monitors an operation input from a user. When receiving an imaging instruction, the system control unit 190 changes the operation mode in the imaging unit 120. In addition, the system control unit 190 transmits information indicating the reception of the imaging instruction to the display control unit 150.

In the use of the progressive method, the imaging unit 120 outputs image data of one frame every, for example, 1/30 second. In the use of the interface method, the imaging unit 120 outputs image data of one field (even-numbered or odd-numbered lines in one frame) every, for example, 1/60 second. As for the operation modes, the imaging unit 120 has a monitoring mode in which a moving image is displayed upon determination of a subject and a still mode in which a still image is captured. The imaging unit 120 performs different operations for those operation modes. In the monitoring mode, a small number of pixels are enough to grasp the entire picture of a subject and the resolution is adjusted to the resolution of the display 160 in consideration of balance between the resolution and power consumption. In the still mode, higher-resolution higher-density image data is output. Since the number of pixels is large, it takes longer time to output image data than the monitoring mode.

To capture a still image, the imaging unit 120 is generally operated in the monitoring mode to display the latest image on the display 160. When an imaging instruction is given, for example, the user presses the shutter release, the imaging unit 120 is switched to the still mode.

It takes relatively long time to switch between the monitoring mode and the still mode. In addition, a distorted image may be output during switching therebetween. Accordingly, display on the display 160 is switched to mask display in, for example, black color from the field (or frame) next to the field (or frame) in which an imaging instruction has been given. The mask display is performed until output of image data captured in the still mode is finished, thereby preventing output of a distorted image.

Figure 2:
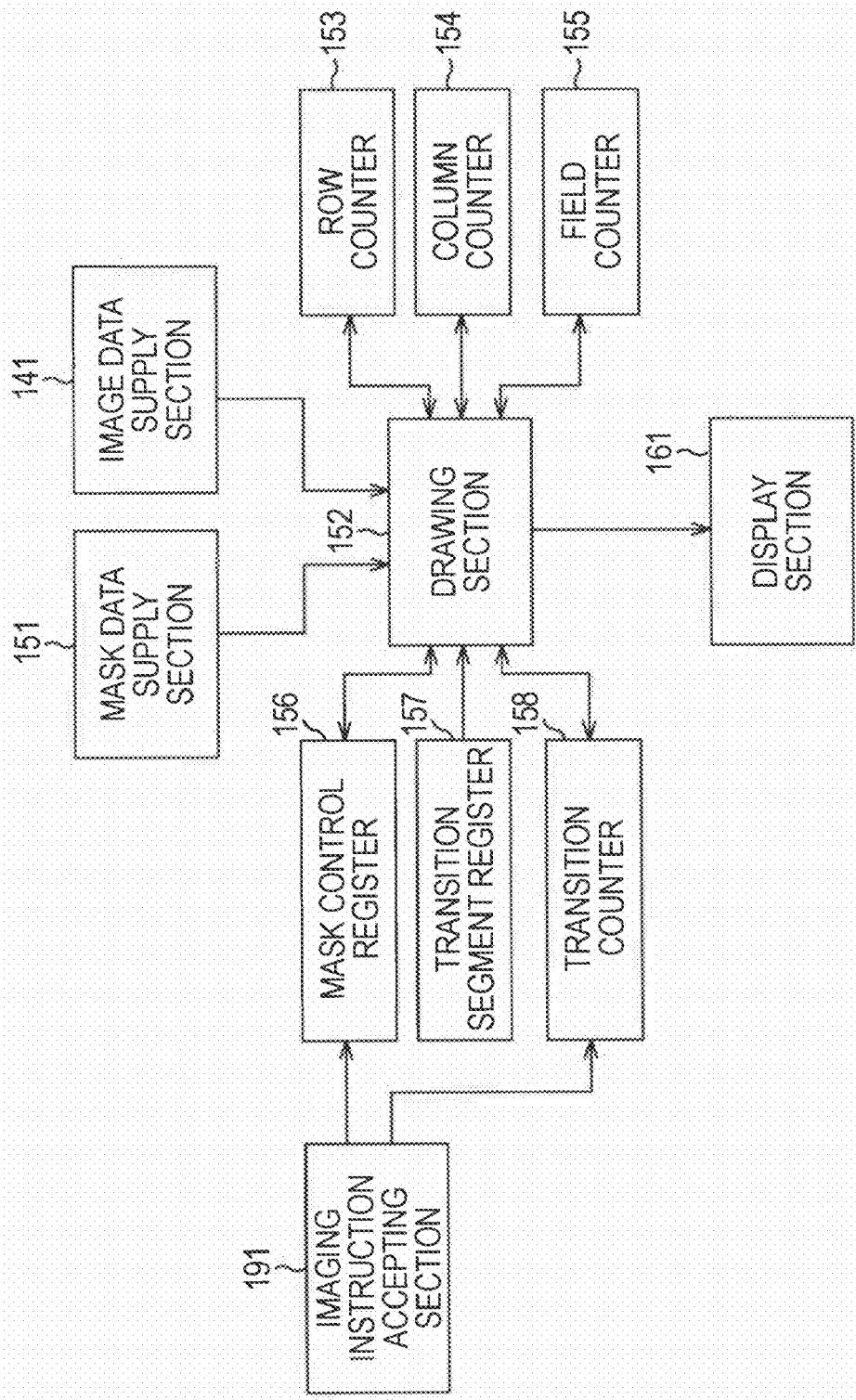
FIG. 2 is a block diagram illustrating the functional structure of substantial part of the apparatus according to the embodiment of the present invention.

FIG. 2 is a diagram illustrating the functional structure of substantial part of the imaging apparatus according to this embodiment of the present invention. It is assumed that the substantial part includes an image data supply section 141, a mask data supply section 151, a drawing section 152, a row counter 153, a column counter 154, a field counter 155, a mask control register 156, a transition segment register 157, a transition counter 158, a display section 161, and an imaging instruction accepting section 191.

The image data supply section 141 supplies captured image data to the drawing section 152. The image data is obtained by performing signal processing on an image signal through the signal processing unit 130, the image signal being captured through the imaging unit 120. The image data is supplied from the image memory 140 to the display control unit 150.

The mask data supply section 151 supplies data that is to be used as mask data when being displayed on the display 160. The mask data may include color information and transmittance. For example, data representing black color with a transmittance of 100% may be used.

The drawing section 152 draws pixels to be output to the display section 161 using image data supplied from the image data supply section 141 or mask data supplied from the mask data supply section 151.

The row counter 153 indicates the row of pixels to be drawn by the drawing section 152. The column counter 154 indicates the column of a pixel to be drawn by the drawing section 152. When display is performed according to the interlace method, the field counter 155 indicates a field to be drawn by the drawing section 152. When display is performed according to the progressive method, the field counter 155 is not used. The drawing section 152 refers to image data supplied from the image data supply section 141 in accordance with information indicated by the row counter 153, the column counter 154, and the field counter 155, and outputs the result of drawing.

The mask control register 156 holds an imaging instruction acceptance signal indicating that an operation input corresponding to an imaging instruction is accepted. The mask control register 156 validates the imaging instruction acceptance signal in accordance with an instruction from the imaging instruction accepting section 191. The drawing section 152 refers to the imaging instruction acceptance signal.

The transition segment register 157 holds a transition segment after an operation input corresponding to an imaging instruction is accepted until mask data is displayed. The transition segment is a parameter depending on the structure of the imaging apparatus. Accordingly, the optimum value can be set in the transition segment register 157 according to the structure of the imaging apparatus.

The transition counter 158 holds the current position in a transition segment. Ordinarily, the transition counter 158 is reset when an operation input corresponding to an imaging instruction is accepted and counts up to the end of the transition segment. The transition counter 158 is used upon mixing image data and mask data.

The imaging instruction accepting section 191 accepts an operation input corresponding to an image instruction from the user. The imaging instruction accepting section 191 is realized by, for example, the shutter release.

The display section 161 displays pixels output from the drawing section 152. The display section 161 corresponds to the display 160.

The mask data supply section 151, the drawing section 152, the row counter 153, the column counter 154, the field counter 155, the mask control register 156, the transition segment register 157, and the transition counter 158 are realized as functions of the display control unit 150.

FIG. 3 is a timing diagram showing an operation of the imaging apparatus 100 according to this embodiment of the present invention.

In the use of the interlace method, image signals output from the imaging unit 120 via the signal line 129 are sequentially transferred every field. In the use of the progressive method, those signals are sequentially transferred every frame. In FIG. 3, it is assumed that the interlace method is used. An odd-numbered field signal 711 of a first frame, an even-numbered field signal 712 of the first frame, and an odd-numbered field signal 713 of a second frame are shown. In some of image sensors, each field or frame includes invalid data at its end. In this example shown in FIG. 3, invalid data blocks 721 to 723 at the respective ends of the signals 711 to 713 are shown by stripes.

Dash line 701 indicates the time at which an imaging instruction is input by the user. A captured image signal supplied after the imaging instruction has been input may include a distorted image segment as described above. In FIG. 3, parts including such a distorted image segment are shown by hatching.

Each processed signal, which is output from the signal processing unit 130 via the signal line 139, is output slightly later than the corresponding image signal. Such delay is caused in the imaging circuitry. The transfer rate of this signal is the same as that of the image signal. Since the invalid data blocks 721 to 723 are not necessary for the subsequent processing, those data blocks are not output from the signal processing unit 130.

Output 349 after completion of recording into the image memory and memory output display 359 shown below the processed signals represent timings obtained when it is assumed that the display control unit 150 waits until recording of the signals supplied from the signal processing unit 130 into the image memory 140 is finished and then reads data. In this case, mask display can be performed from the head of the first-frame even-numbered field signal 712, but the display itself may be delayed. According to the embodiment of the present invention, the display control unit 150 reads data via the signal line 149 without waiting for completion of recording the signals into the image memory 140.

In other words, the image data read from the image memory 140 via the signal line 149 is output earlier than the output 349. In this example, since the imaging instruction is given in the middle of the first-frame even-numbered field signal 712, display is switched to mask display from the beginning of the next field. Accordingly, a distorted image segment may be remained (refer to uncontrolled display output 459). According to this embodiment of the present invention, mask display is performed just after the imaging instruction 701 is given, thereby controlling so as not to output a distorted image segment as a display output to the display 160 via the signal line 159.

Figure 4A:
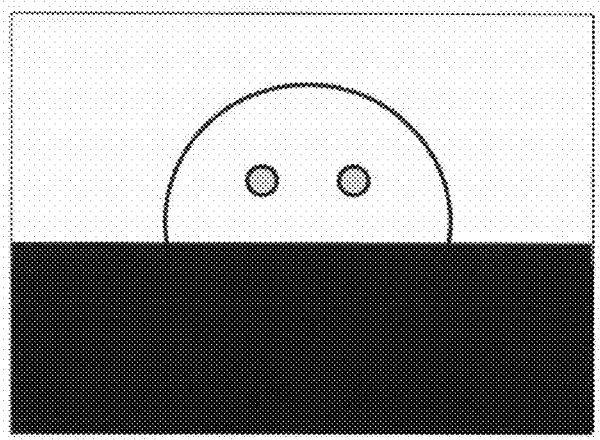
FIGS. 4A and 4B are diagrams illustrating examples displayed by the imaging apparatus 100 according to the embodiment of the present invention.
Figure 4B:
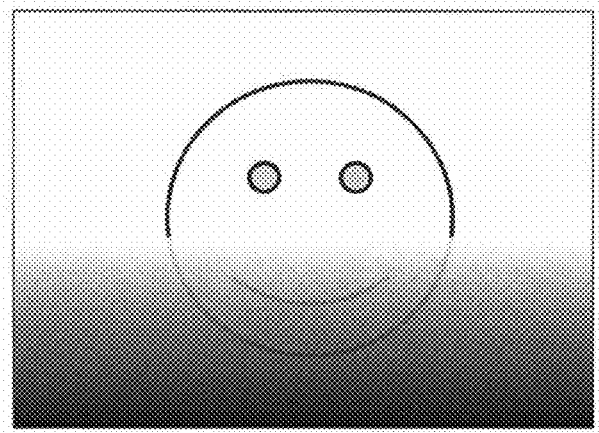

In this embodiment, mask data representing black color may be displayed just after an imaging instruction is given. In this case, the mask data is displayed in the middle of an image of one field as shown in FIG. 4A. Some original images may give an unnatural impression. According to a modification of the embodiment, data is not completely switched to mask data just after an imaging instruction is given. An image is drawn while image data representing pixel values of respective pixels in an original image and mask data are being mixed so that the pixel values of the pixels are gradually changed to the mask data during a transition segment 703 between the acceptance of the imaging instruction and time 702 when display of the distorted image segment is started. At that time, preferably, a transmittance is gradually increased in addition to changing a color signal so that the image data is gradually changed to the mask data. Consequently, the image can be displayed so as to be naturally switched to mask display as shown in FIG. 4B.

The relationship between an imager and display control will now be described in detail with reference to FIGS. 5A and 5B.

Figure 5A:
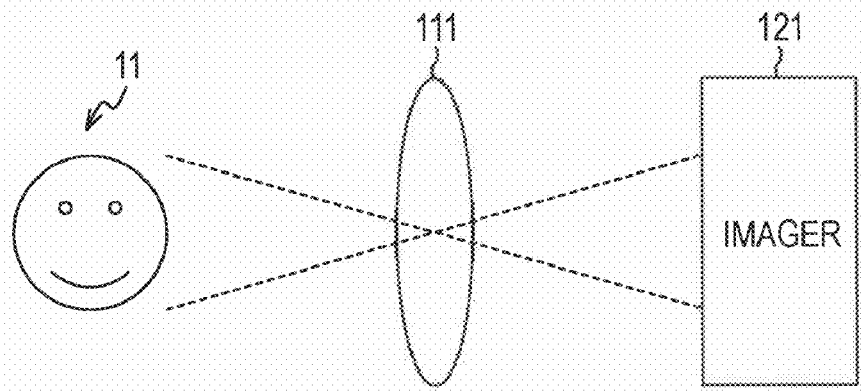
FIGS. 5A and 5B are diagrams each illustrating the relationship between a lens unit 110 and an imager 121.
Figure 5B:
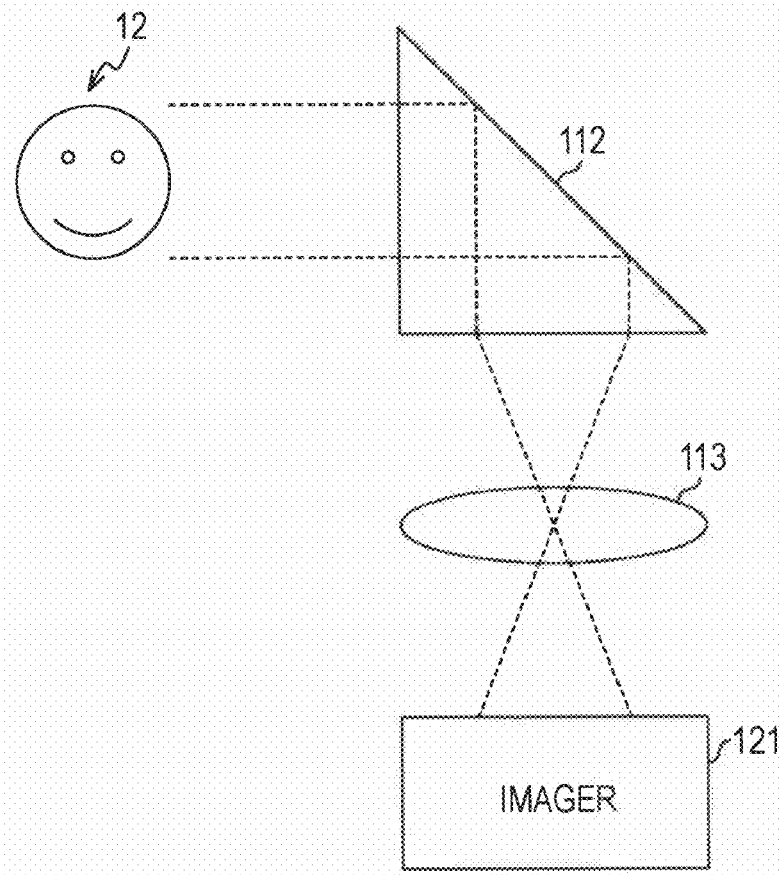

FIGS. 5A and 5B are diagrams illustrating the relationship between the lens unit 110 and the imager indicated at 121. The imager 121 corresponds to the imaging unit 120 and includes a CCD or CMOS image sensor.

FIG. 5A illustrates the relationship between a typical optical system and the imager 121 viewed from a side of a housing of the imaging apparatus 100. In this case, the optical system including a group of lenses 111 are disposed in front of the imager 121. The lens group 111 arranged between a subject 11 and the imager 121 converges light reflected from the subject 11 on the imaging surface of the imager 121 such that a subject image corresponding to the light is inverted vertically (upside down) and horizontally (right side left).

FIG. 5B illustrates the relationship between a dioptric system and the imager 121 viewed from a side of the housing of the imaging apparatus 100. In this case, the dioptric system includes a group of lenses 113 arranged in front of the imager 121 and a reflecting member 112 that is disposed between a subject 12 and the lens group 113 and refracts the optical axis of light. The reflecting member 112 reflects light from the subject 12 substantially at a right angle to vertically invert a subject image. The reflecting member 112 is realized by, for example, a prism. The lens group 113 converges light coming from the reflecting member 112 on the imaging surface of the imager 121 such that a subject image corresponding to the light is inverted vertically (upside down) and horizontally (right side left). The dioptric system is generally used in a low-profile imaging apparatus.

Figure 6A:
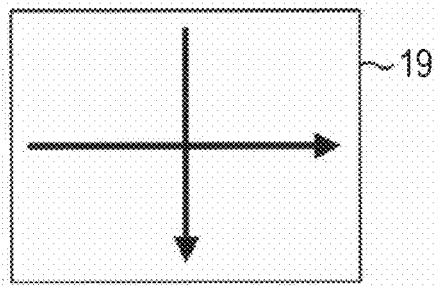
FIGS. 6A to 6D are diagrams each illustrating the relationship between a subject and display on the display 160.

FIGS. 6A to 6D are diagrams illustrating the relationship between a subject and display on the display 160. FIG. 6A illustrates a subject image 19 viewed from the imaging apparatus 100. For convenience of understanding, bold arrows in the subject image 19 are arranged along the scanning directions on the display surface of a typical display.

Figure 6B:
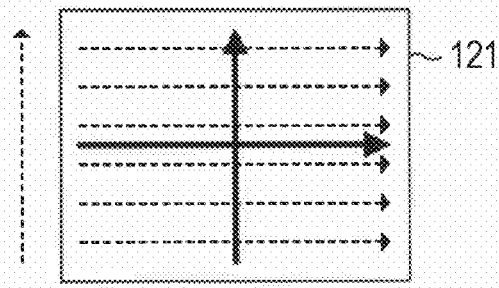

FIG. 6B illustrates an image formed on the imaging surface of the imager 121 as viewed from the front of the imager 121 (i.e., from a subject) in the use of a typical optical system as shown in FIG. 5A. Bold arrows correspond to the formed subject image 19. Dash-line arrows indicate the directions in which image data is output from the imager 121. In this case, one bold arrow matches one dash-line arrow shown on the outside of the imager 121 in the vertical direction. Accordingly, image signals are read from the imager 121 from the bottom to the top, so that the image is displayed on the display 160 from the top to the bottom.

Figure 6C:
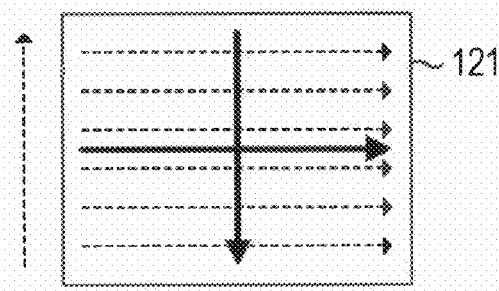

FIG. 6C illustrates an image formed on the imaging surface viewed from the upper side of a related-art imaging apparatus (i.e., from the front of the imager 121) in the use of a dioptric system as shown in FIG. 5B. Bold arrows correspond to the formed subject image 19. Dash-line arrows indicate the directions in which image data is output from the imager 121. In this case, one bold arrow is opposite to one dash-line arrow shown on the outside of the imager 121 in the vertical direction. When image signals are read from the imager 121 from the bottom to the top, the image is displayed on the display 160 from the bottom to the top. Assuming that the imager 121 includes a CMOS sensor, either the order from the bottom to the top or the order from the top to the bottom may be selected as the order in which image data is output. Assuming that the imager 121 includes a CCD sensor, the direction in which image data is output is structurally restricted to either direction. When the imager includes a typical CCD sensor, therefore, the lower side of the imaging surface of the imager is allowed to face toward a subject so that image data is output from the bottom to the top and from the left to the right of the imaging surface for general optical system applications.

According to the embodiment of the present invention, in the use of a dioptric system, the imager is disposed such that the upper side of the imaging surface faces toward a subject and data is read from the image memory 140 from the top to the bottom. Consequently, an image is displayed from the top to the bottom on the display 160.

Figure 6D:
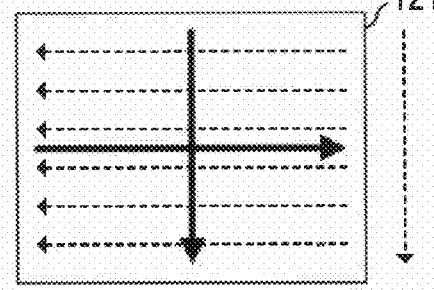

FIG. 6D illustrates an image formed on the imaging surface viewed from the upper side of the imaging apparatus 100 according to the present embodiment (i.e., the front side of the imager 121) in the use of a dioptric system as shown in FIG. 5B. Bold arrows correspond to the formed subject image 19. Dash-line arrows indicate the directions in which image data is output from the imager 121. In this case, one bold arrow matches one dash-line arrow shown on the outside of the imager 121 in the vertical direction. Image signals are read from the imager 121 from the top to the bottom, so that the image is displayed from the top to the bottom on the display 160.

An operation of the imaging apparatus 100 according to the embodiment of the present invention will now be described with reference to the drawings.

Figure 7:
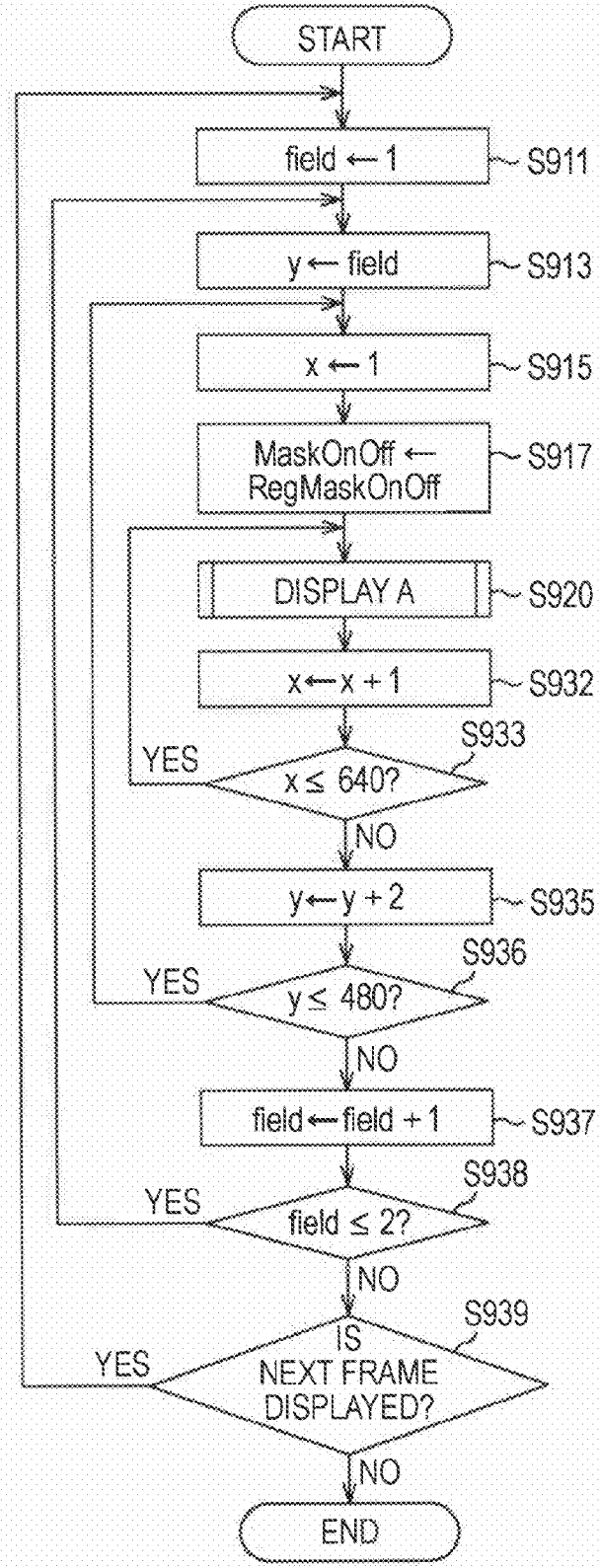
FIG. 7 is a flowchart showing a first example of a process by the imaging apparatus 100 according to the embodiment of the present invention.

FIG. 7 is a flowchart explaining a first example of a process by the imaging apparatus 100 according to the embodiment of the present invention. In the first example, mask display is performed in line units. It is assumed that an image of VGA size (640×480 pixels) is displayed at a transfer rate of 1/60 second according to the interlace method. A variable "x", held in the column counter 154, indicates a column position in the horizontal direction. A variable "y", held in the row counter 153, indicates a row position in the vertical direction. A variable "field" is held in the field counter 155. When the variable "field" has a value of "1", it represents an odd-numbered field. When this variable has a value of "2", it represents an even-numbered field. A variable "RegMaskOnOff" is held in the mask control register 156. When this variable indicates "On", it means that mask display is performed. When this variable indicates "Off", it means that mask display is not performed. A variable "MaskOnOff" is used to refer to a value of the mask control register 156.

First, the variable "field" is initialized to "1" (step S911), the variable "y" is initialized to a value ("1" at first) of the variable "field" (step S913), and the variable "x" is initialized to "1" (step S915). A value of the variable "RegMaskOnOff" is set to the variable "MaskOnOff" (step S917). A pixel (x, y) is displayed in accordance with a value of the variable "MaskOnOff" (step S920).

While the variable "x" is increased by "1" (step S932) until pixels of one line (640 pixels in this example) are displayed (S933), processing in step S920 and the subsequent steps is repeated.

When the pixels of one line are displayed, processing proceeds to display processing for the next line. In this example, since it is assumed that the interlace method is used, while the variable "y" is increased by "2" (step S935), processing in step S915 and the subsequent steps is repeated until pixels of one field (corresponding to 240 lines in this example) are displayed (step S936).

When the pixels of one field are displayed, processing proceeds to display processing for the next field. The variable "field" is increased by "1" (step S937). If a value of the variable "field" is "2" or less (step S938), processing in step S913 and the subsequent steps is repeated. When the value of the variable "field" exceeds "2", processing in step S911 and the subsequent steps is repeated to display the next frame (step S939). If the next frame is not displayed, the process is terminated.

Figure 8:
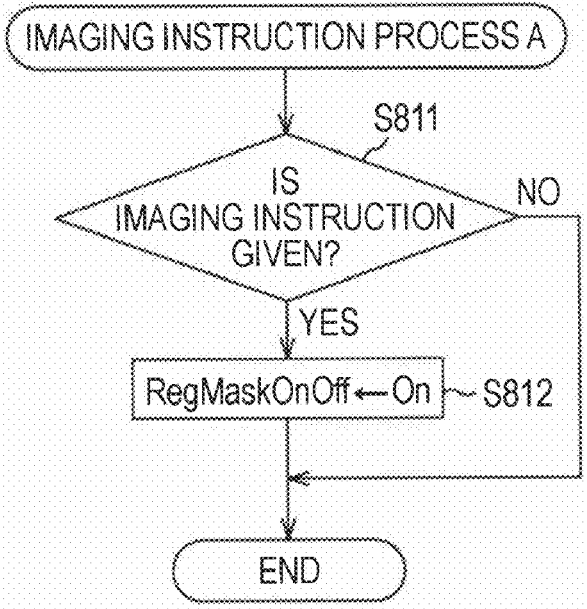
FIG. 8 is a flowchart showing an example of a process for processing an imaging instruction in the first example in accordance with the embodiment of the present invention.

FIG. 8 is a flowchart showing an example of a process for processing an imaging instruction (hereinafter, "imaging instruction process") in the first example in accordance with the embodiment of the present invention. This imaging instruction process is performed asynchronously with the process explained in FIG. 7. When the shutter release is pressed, a value of the variable "RegMaskOnOff" is set in this process.

Specifically, when an imaging instruction is given upon pressing the shutter release (step S811), "On" indicating valid is set to the variable "RegMaskOnOff" (step S812). The variable "RegMaskOnOff" is referred to in step S917 in FIG. 7.

Figure 9:
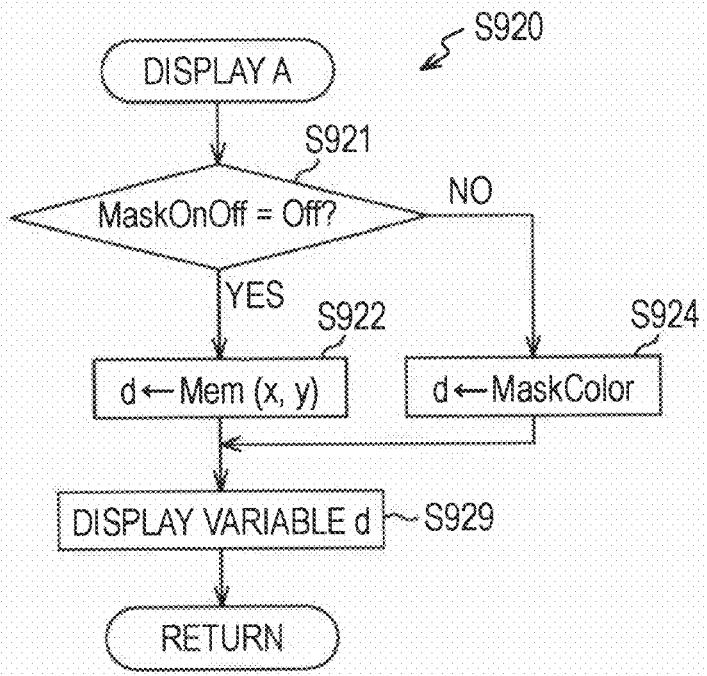
FIG. 9 is a flowchart showing an example of a process for display A in the first example in accordance with the embodiment of the present invention.

FIG. 9 is a flowchart showing an example of a process for display A (step S920) in the first example in accordance with the embodiment of the present invention.

In the process for display A, when the variable "MaskOnOff" indicates "Off" (step S921), the pixel (x, y) in the image memory is read as a variable "d" (step S922) and is displayed on the display 160 (step S929). Whereas, when the variable "MaskOnOff" indicates "On" (step S921), mask data MaskColor having a value representing, for example, black color is set as a variable "d" (step S924) and is displayed on the display 160 (step S929).

As described above, according to the first example in accordance with the embodiment of the present invention, whether the shutter release has been pressed is determined each time pixels of one line are displayed. Advantageously, mask display can be performed in line units.

Figure 10:
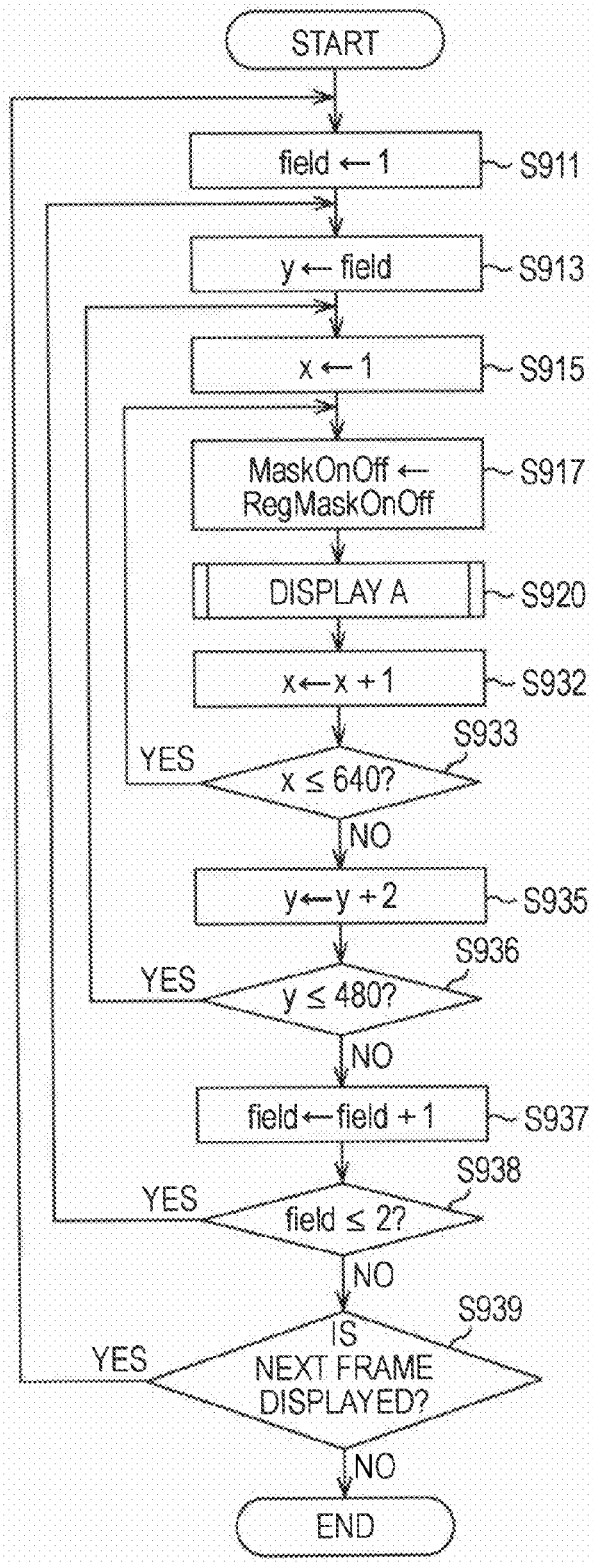
FIG. 10 is a flowchart showing a second example of a process by the imaging apparatus 100 according to the embodiment of the present invention.

FIG. 10 is a flowchart explaining a second example of a process by the imaging apparatus 100 according to the embodiment of the present invention. In the second example, mask display is performed in pixel units. Other preconditions are the same as those in the first example.

In the second example, the time when a value indicated by the variable "RegMaskOnOff" is referred to is different from that in the first example. In the first example, a value of the variable "RegMaskOnOff" is set to the variable "MaskOnOff" in step S917 each time pixels of one line are displayed. In the second example, a value indicated by the variable "RegMaskOnOff" is set to the variable "MaskOnOff" in step S917 each time one pixel is displayed. Accordingly, since whether mask display is performed is determined every pixel (step S920) in processing for display A, mask display can be performed in pixel units.

Figure 11:
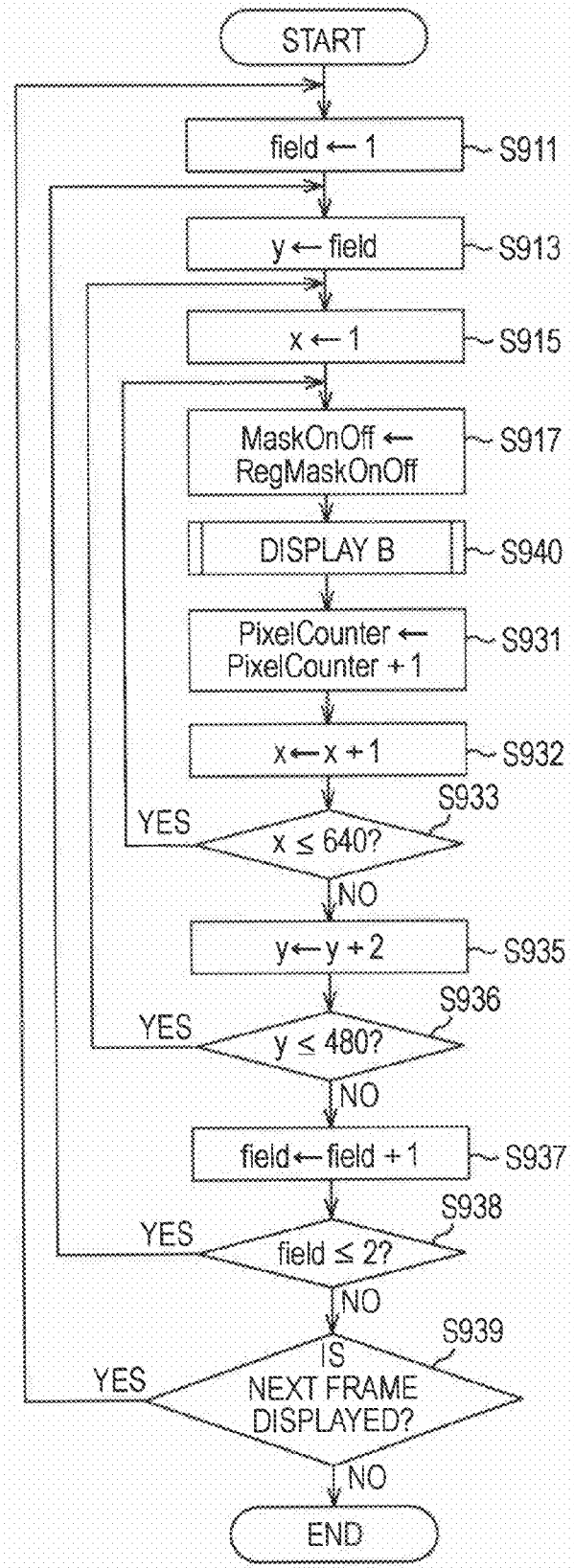
FIG. 11 is a flowchart showing a third example of a process by the imaging apparatus 100 according to the embodiment of the present invention.

FIG. 11 is a flowchart explaining a third example of a process by the imaging apparatus 100 according to the embodiment of the present invention. In the third example, mask display is performed in pixel units in a manner similar to the second example and preconditions are the same as those of the second example. The third example uses a variable "PixelCounter" that is reset when the shutter release is pressed and is increased each time one pixel is displayed.

The variable "PixelCounter" is held in the transition counter 158 and is increased by "1" (step S931) each time one pixel is displayed (step S940). The variable "PixelCounter" is used to obtain a pixel-value mixing ratio in processing for display B (step S940).

Figure 12:
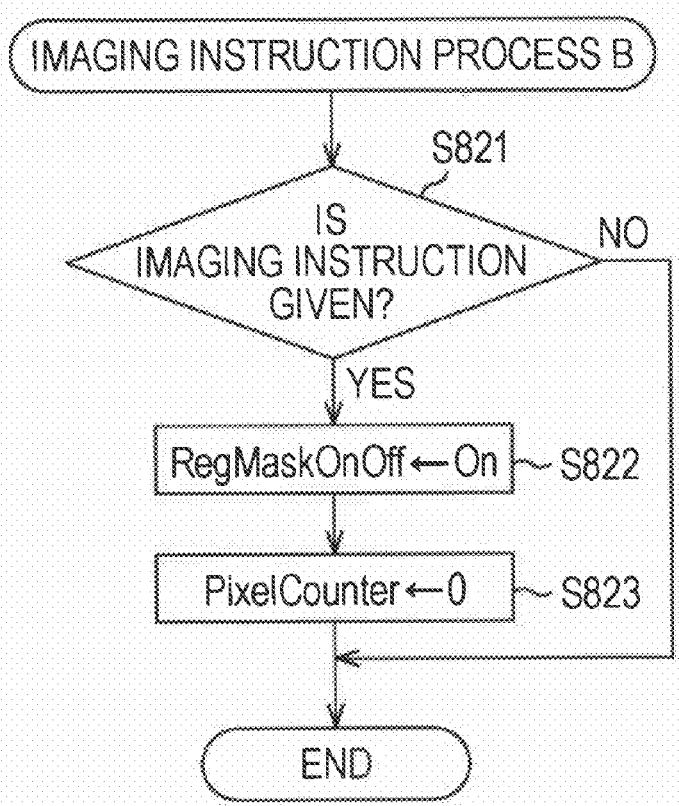
FIG. 12 is a flowchart showing an example of a process for processing an imaging instruction in the third example in accordance with the embodiment of the present invention.

FIG. 12 is a flowchart explaining an example of a process for processing an imaging instruction in the third example in accordance with the embodiment of the present invention. This process is performed asynchronously with the process explained with reference to FIG. 11. When the shutter release is pressed, a value of the variable "RegMaskOnOff" is set, thus initializing the variable "PixelCounter".

Specifically, when an imaging instruction is given upon pressing the shutter release (step S821), "On" is set to the variable "RegMaskOnOff" (step S822) and the variable "PixelCounter" is initialized to "0" (step S823). The variable "RegMaskOnOff" is referred to in step S917 in FIG. 11. The variable "PixelCounter" is referred to in step S931 in FIG. 11.

Figure 13:
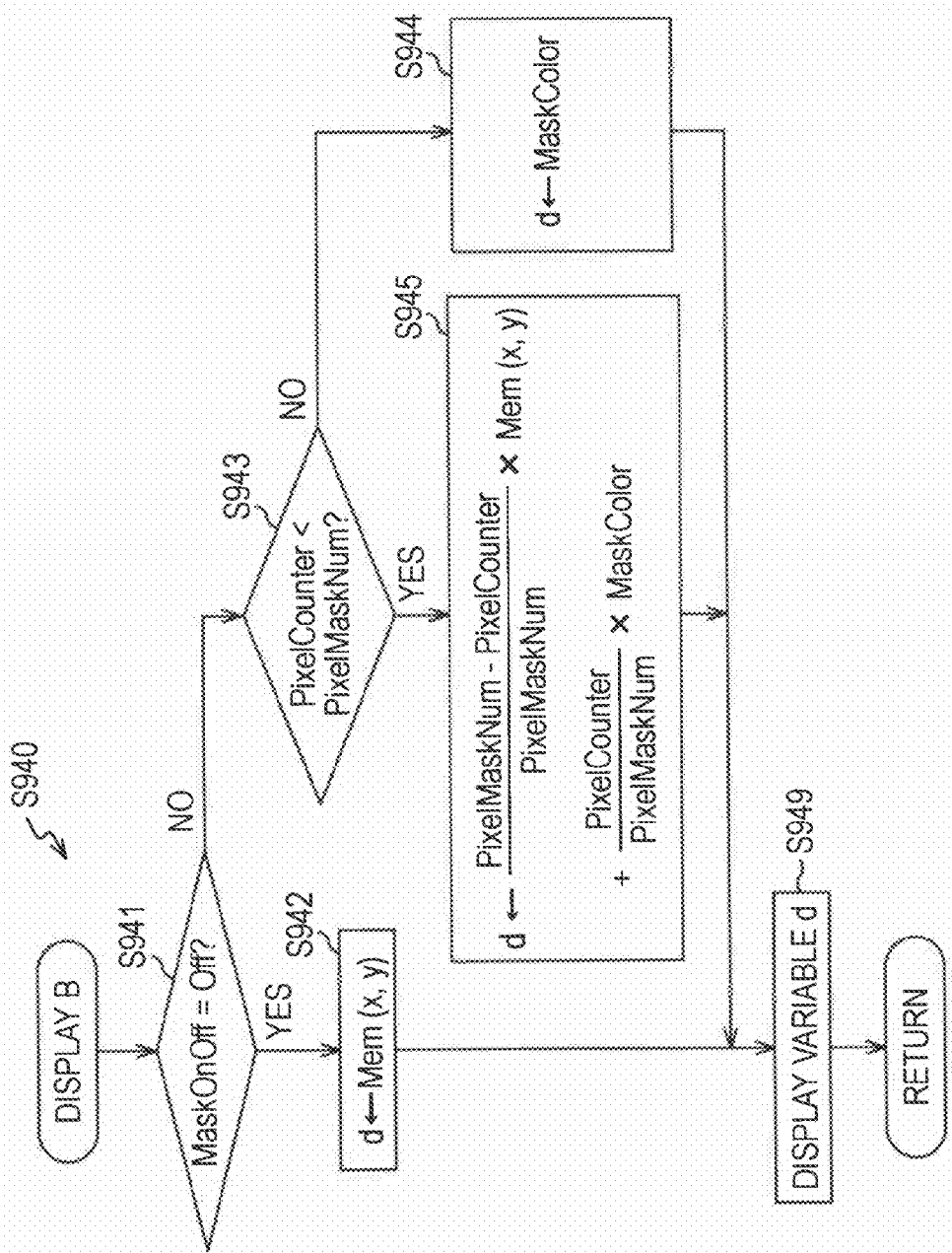
FIG. 13 is a flowchart showing an example of a process for display B in the third example in accordance with the embodiment of the present invention.

FIG. 13 is a flowchart explaining a process for display B (step S940) in the third example in accordance with the embodiment of the present invention.

In the process for display B, when the variable "MaskOnOff" indicates "Off" (step S941), a pixel (x, y) in the image memory is read as a variable "d" (step S942) and is displayed on the display 160 (step S949). Processing in those steps is the same as those in the process for display A explained with reference to FIG. 9.

Whereas, when the variable "MaskOnOff" indicates "On" (step S941), the relationship between the variable "PixelCounter" and a variable "PixelMaskNum" is determined. The variable "PixelMaskNum" is held in the transition segment register 157 and indicates the number of pixels in the transition segment 703 shown in FIG. 3. When the variable "PixelCounter" is less than the variable "PixelMaskNum" (step S943), a pixel to be displayed exists within the transition segment 703. Accordingly, the pixel (x, y) in the image memory is mixed with mask data (step S945). Specifically, a pixel value is obtained on the basis of the ratio between the variable "PixelMaskNum" and the variable "PixelCounter" using the following expression and the obtained value is set as the variable "d".

$$d \leftarrow \frac{PixelMaskNum - PixelCounter}{PixelMaskNum} \times Mem(x, y) + \frac{PixelCounter}{PixelMaskNum} \times MaskColor$$

When the variable "PixelCounter" is not less than the variable "PixelMaskNum" (step S943), a pixel to be displayed does not exist within the transition segment 703. Accordingly, mask data MaskColor having a value representing, for example, black color is set as the variable "d" (step S944). In either case, a pixel having the pixel value set as the variable "d" is displayed on the display 160 (step S949).

As described above, in the third example, a pixel (x, y) read from the image memory is mixed with mask data in pixel units in the transition segment 703, so that mask data can be gradually displayed.

Figure 14:
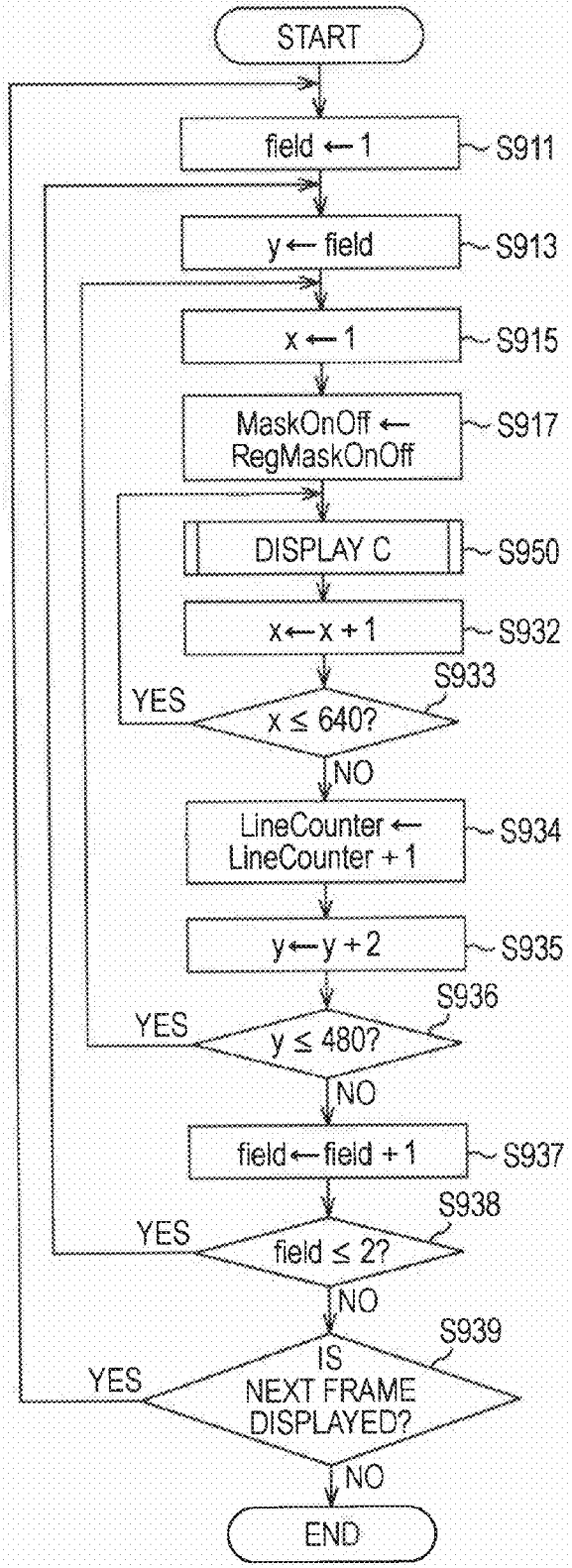
FIG. 14 is a flowchart showing a fourth example of a process by the imaging apparatus 100 according to the embodiment of the present invention.

FIG. 14 is a flowchart explaining a fourth example of a process by the imaging apparatus 100 according to the embodiment of the present invention. In the fourth example, mask display is performed in line units and preconditions are the same as those of the first example. The fourth example uses a variable "LineCounter" that is reset when the shutter release is pressed and is increased each time pixels of one line are displayed.

The variable "LineCounter" is held in the transition counter 158 and is increased by "1" (step S934) each time pixels of one line are displayed (step S950). The variable "LineCounter" is used to obtain a pixel-value mixing ratio in processing for display C (step S950).

Figure 15:
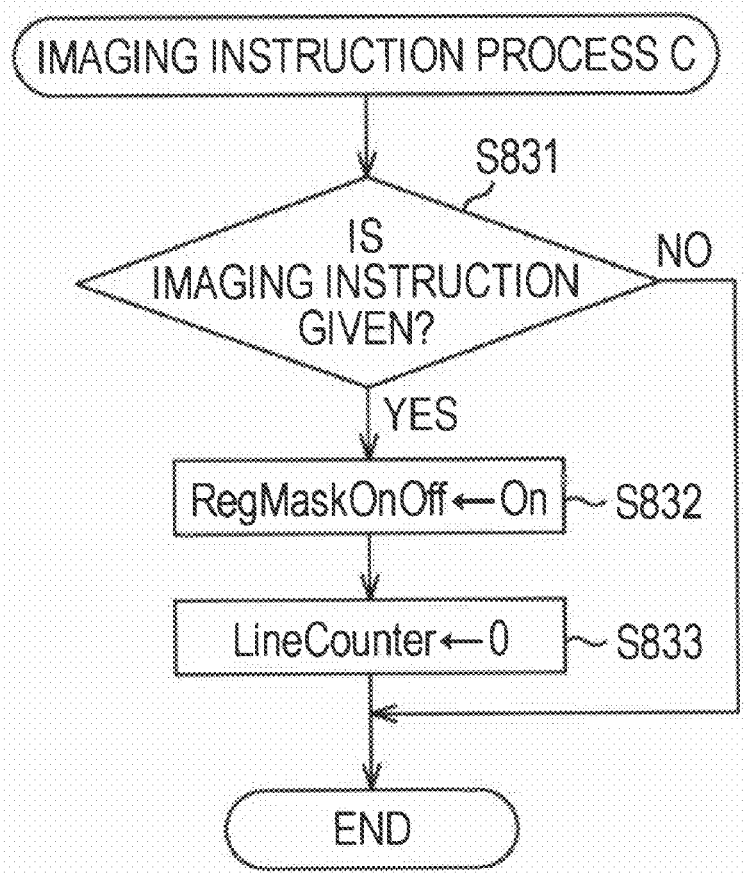
FIG. 15 is a flowchart showing an example of a process for processing an imaging instruction in the fourth example in accordance with the embodiment of the present invention.

FIG. 15 is a flowchart showing an example of a process for processing an imaging instruction in the fourth example in accordance with the embodiment of the present invention. This process is performed asynchronously with the above-described process of FIG. 14. When the shutter release is pressed, a value of the variable "RegMaskOnOff" is set, thus initializing the variable "LineCounter".

Specifically, when an imaging instruction is given upon pressing the shutter release (step S831), "On" is set to the variable "RegMaskOnOff" (step S832), so that the variable "LineCounter" is initialized to "0" (step S833). The variable "RegMaskOnOff" is referred to in step S917 in FIG. 14. The variable "LineCounter" is referred to in step S934 in FIG. 14.

Figure 16:
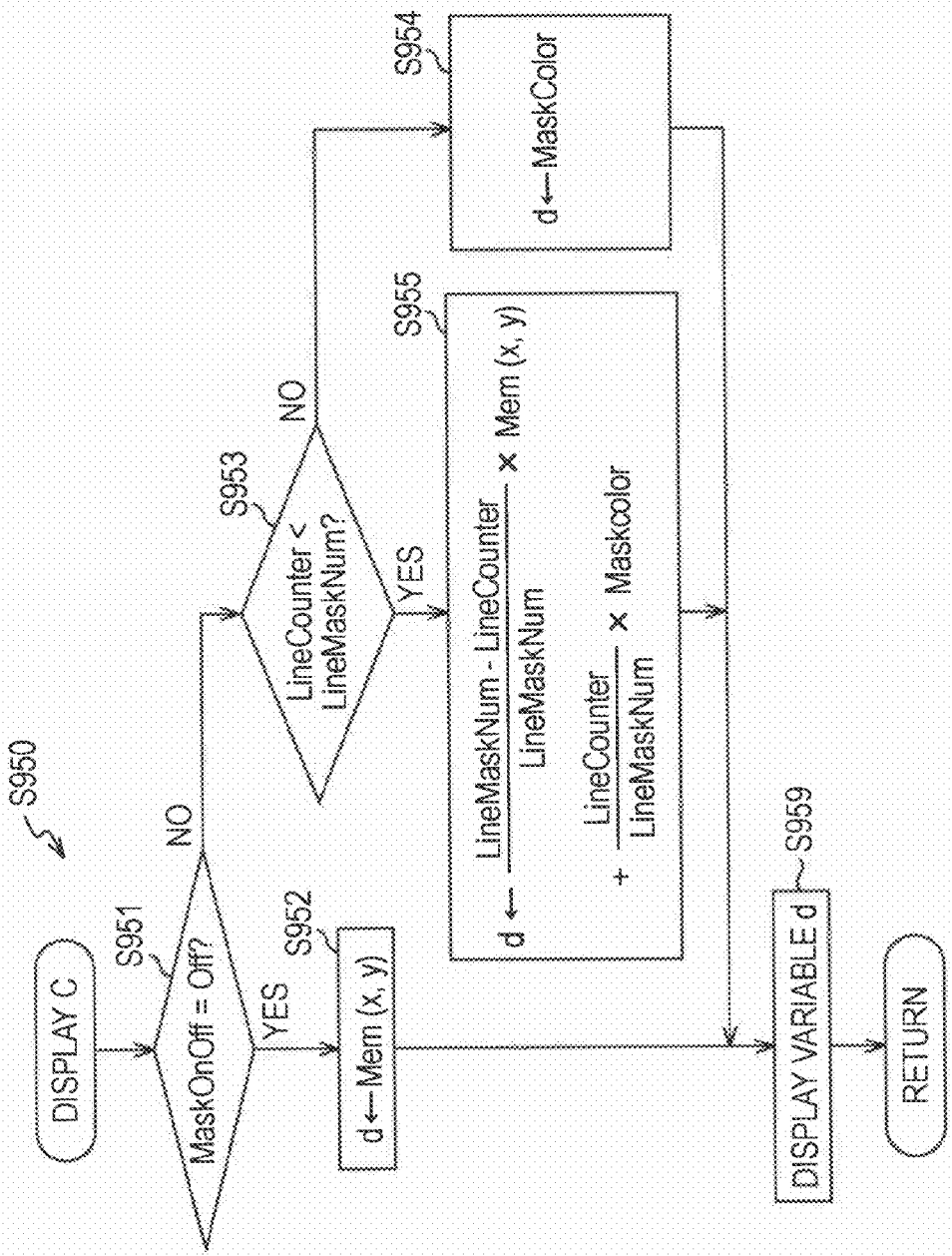
FIG. 16 is a flowchart showing an example of a process for display C in the fourth example in accordance with the embodiment of the present invention.

FIG. 16 is a flowchart showing an example of a process for display C (step S950) in the fourth example in accordance with the embodiment of the present invention.

In the process for display C, when the variable "MaskOnOff" indicates "Off" (step S951), a pixel (x, y) in the image memory is read as the variable "d" (step S952) and is displayed on the display 160 (step S959). Processing in those steps is the same as that in the process for display A described with reference to FIG. 9.

Whereas, when the variable "MaskOnOff" indicates "On" (step S951), the relationship between the variable "LineCounter" and a variable "LineMaskNum" is determined. The variable "LineMaskNum" is held in the transition segment register 157 and indicates a line number in the transition segment 703 shown in FIG. 3. When the variable "LineCounter" is less than the variable "LineMaskNum" (step S953), a pixel to be displayed exists within the transition segment 703. Accordingly, the pixel (x, y) read from the image memory is mixed with mask data (step S955). Specifically, a pixel value is obtained on the basis of the ratio between the variable "LineMaskNum" and the variable "LineCounter" using the following expression and the obtained value is set as the variable "d".

$$d \leftarrow \frac{LineMaskNum - LineCounter}{LineMaskNum} \times Mem(x, y) + \frac{LineCounter}{LineMaskNum} \times MaskColor$$

Whereas, when the variable "LineCounter" is not less than the variable "LineMaskNum" (step S953), a pixel to be displayed does not exist in the transition segment 703. Accordingly, mask data MaskColor having a value representing, for example, black color is set as the variable "d" (step S954). In either case, a pixel having the pixel value set as the variable "d" is displayed on the display 160 (step S959).

As described above, in the fourth example, a pixel (x, y) read from the image memory is mixed with mask data in line units in the transition segment 703, so that mask data can be gradually displayed.

Figure 17:
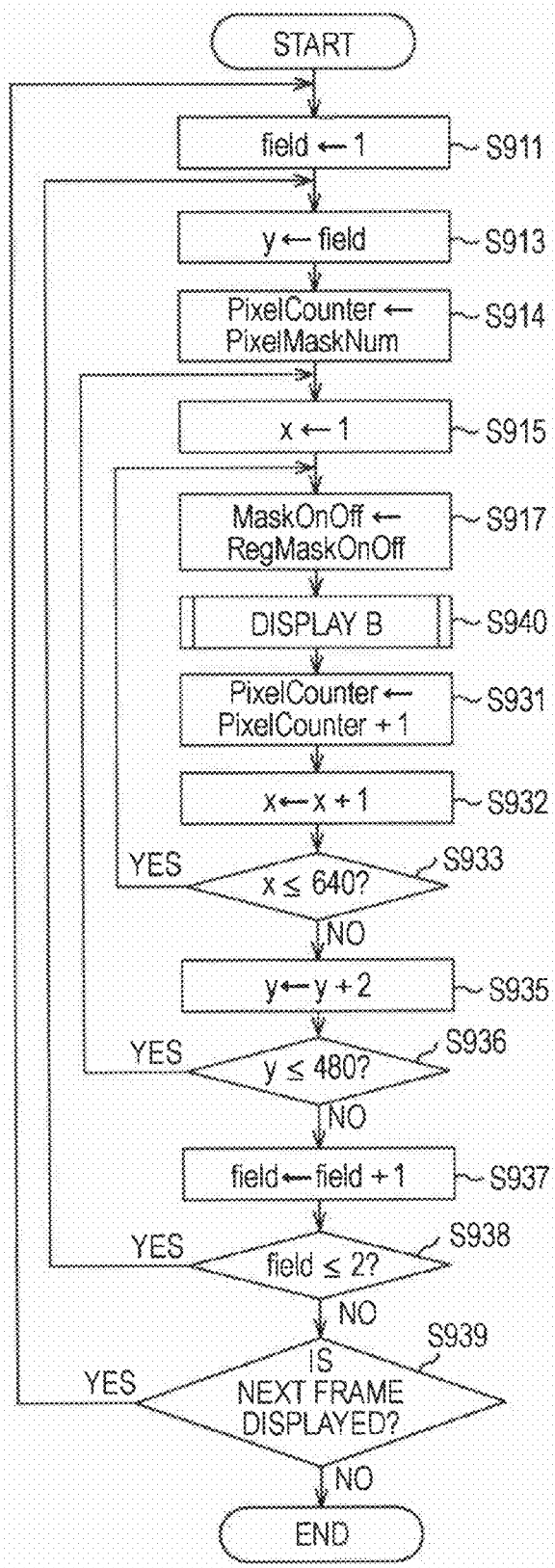
FIG. 17 is a flowchart showing a fifth example of a process by the imaging apparatus 100 according to the embodiment of the present invention.

FIG. 17 is a flowchart showing a five example of a process by the imaging apparatus 100 according to the embodiment of the present invention. In the fifth example, mask display is performed in pixel units and preconditions are the same as those of the third example.

In the fifth example, the variable "PixelCounter" is increased by "1" (step S931) in a manner similar to the third example. The fifth example differs from the third example in that a value of the variable "PixelMaskNum" is set to the variable "PixelCounter" when a new field is displayed (step S914). This processing is a countermeasure against a case where display is changed to another one of a new field while a value of the variable "PixelCounter" does not reach a pixel number corresponding to the transition segment 703. It may be considered that even when mask data is displayed from the beginning upon displaying a new field, mask display does not bring a sense of incongruity.

As described above, in the fifth example, when display is changed to another one of a new field while a value of the variable "PixelCounter" does not reach a pixel number corresponding to the transition segment 703, mask data can be displayed from the beginning.

Figure 18:
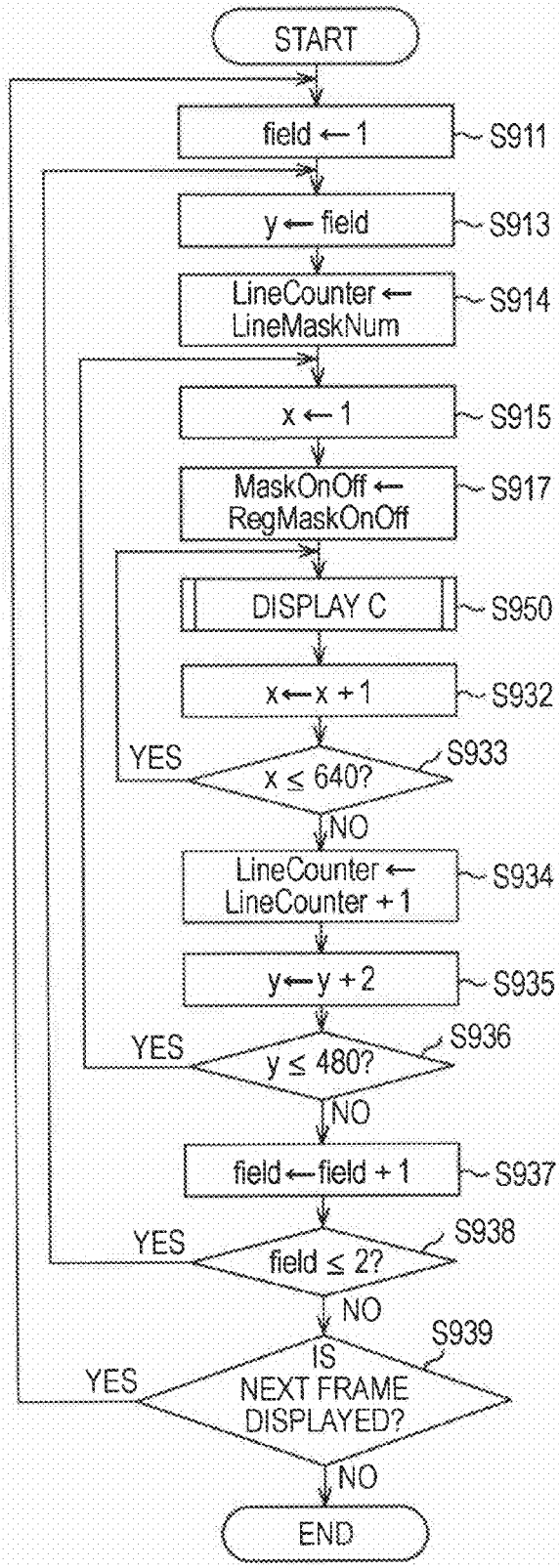
FIG. 18 is a flowchart showing a sixth example of a process by the imaging apparatus 100 according to the embodiment of the present invention.

FIG. 18 is a flowchart showing a sixth example of a process by the imaging apparatus 100 according to the embodiment of the present invention. In the sixth example, mask display is performed in line units and preconditions are the same as those of the fourth example.

The sixth example is obtained by modifying the fourth example in a manner similar to the fifth example. The variable "LineCounter" is increased by "1" (step S934) and, when display is changed to another one of a new field, a value of the variable "LineMaskNum" is set to the variable "LineCounter" (step S914). Consequently, even when display is changed to another one of a new field while a counted line number does not reach a line number corresponding to the transition segment 703, mask data can be displayed from the beginning.

Figure 19:
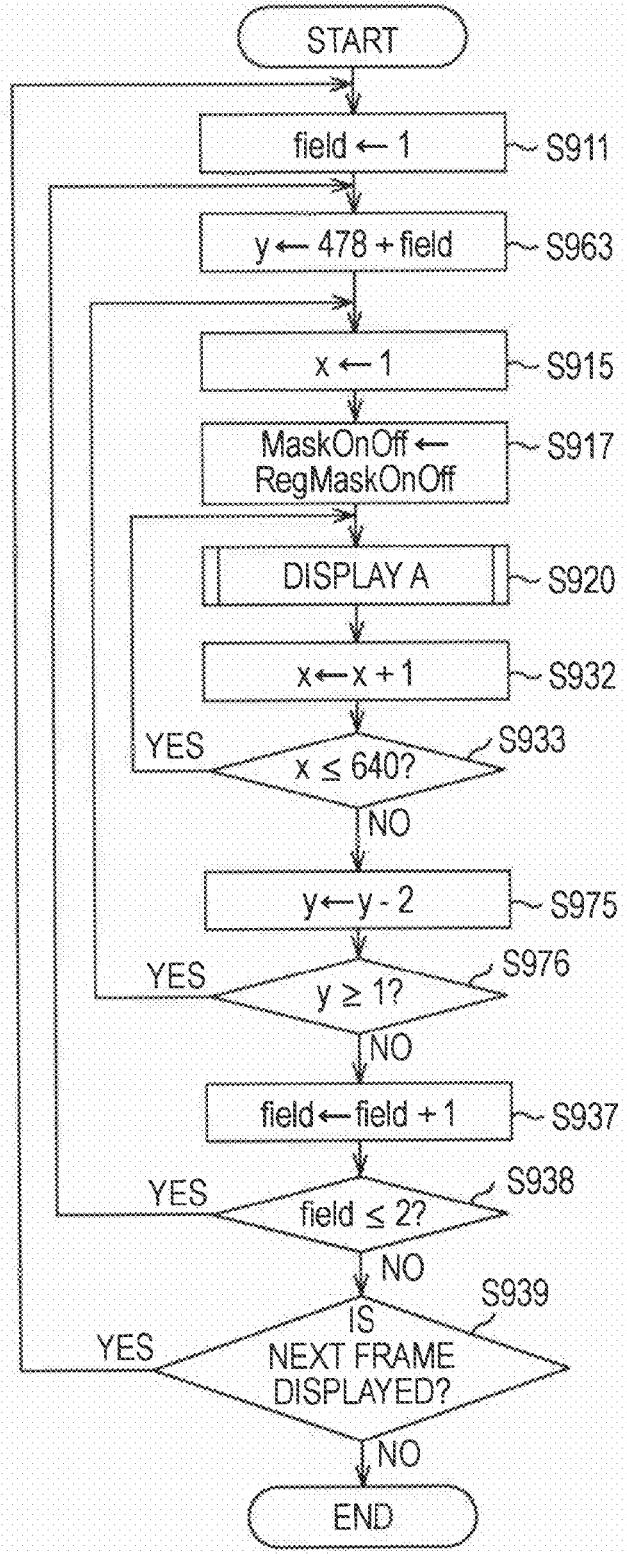
FIG. 19 is a flowchart showing a seventh example of a process by the imaging apparatus 100 according to the embodiment of the present invention.

FIG. 19 is a flowchart showing a seventh example of a process by the imaging apparatus 100 according to the embodiment of the present invention. In the seventh example, mask display is performed in line units and preconditions are the same as those of the first example.

In the seventh example, the variable "y" indicating a counted line number in the vertical direction is changed so as to decrease (steps S963, S975, and S976). The seventh example differs from the first example in that point. Consequently, the process according to the seventh example can cope with the use of a dioptric system described with reference to FIG. 6D.

The seventh example has been explained with respect to an application where mask display is performed in line units. In each of the other examples, the variable "y" may be changed so as to decrease in order to cope with the use of a dioptric system.

Figure 20:
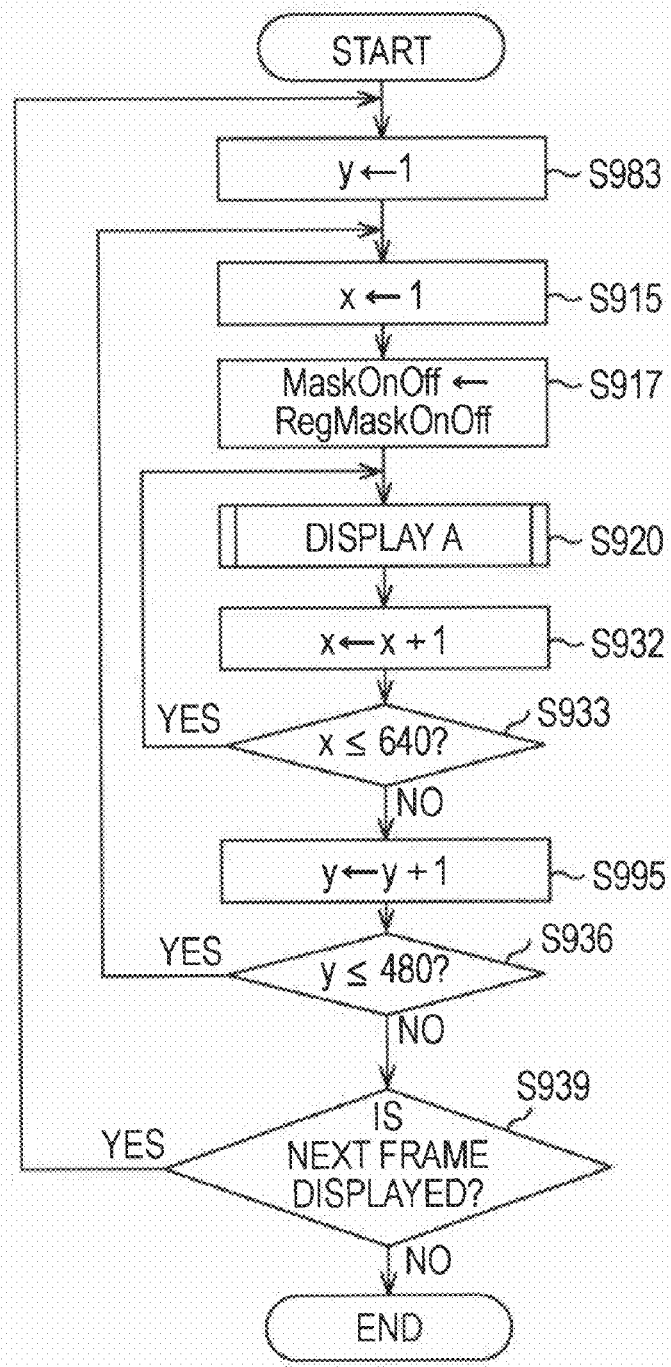
FIG. 20 is a flowchart showing an eighth example of a process by the imaging apparatus 100 according to the embodiment of the present invention.

FIG. 20 is a flowchart showing an eighth example of a process by the imaging apparatus 100 according to the embodiment of the present invention. In the eighth example, it is assumed that the progressive method with a transfer rate of 1/60 second is used. Other preconditions are the same as those of the first example.

In the eighth example, since it is assumed that the progressive method is used, the variable "field" is not used. The variable "y" is initialized to "1" (step S983). Each time pixels of one line are displayed, the variable "y" is increased by "1" (step S995).

The eighth example has been described with respect to an application where mask display is performed in line units. In each of the other examples, the progressive method may be used.

The above-described examples have been explained with respect to the case where mask display is performed while a screen is divided in the horizontal direction as shown in FIGS. 4A and 4B. Mask display may be performed in another display mode.

Figure 21A:
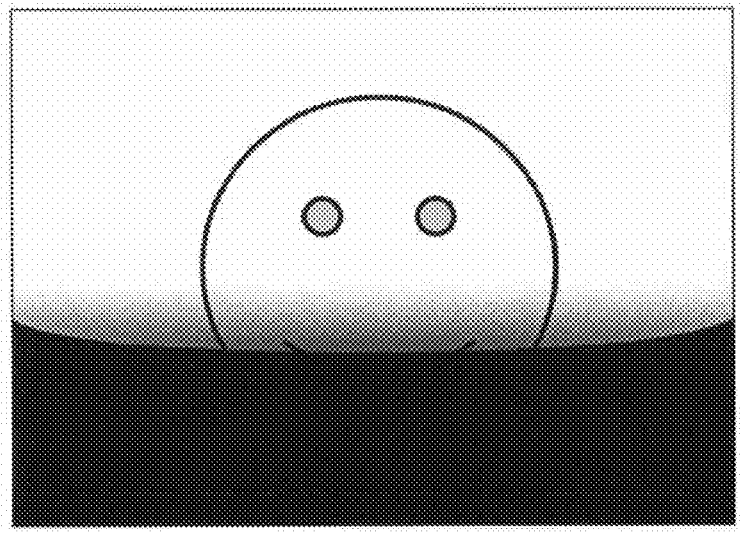
FIGS. 21A and 21B are diagrams illustrating other examples displayed by the imaging apparatus 100 according to the embodiment of the present invention.
Figure 21B:
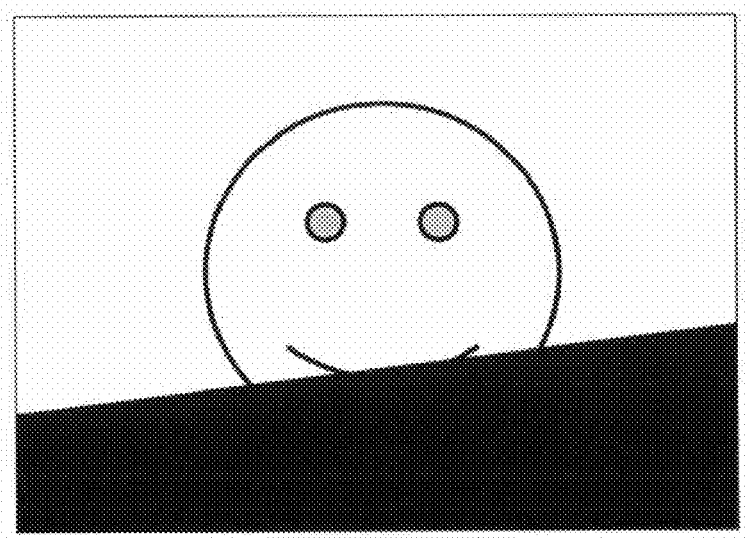

FIG. 21A and 21B are diagrams illustrating other examples displayed by the imaging apparatus 100 according to the embodiment of the present invention. FIG. 21A illustrates a display example in which a mask display area is rounded. FIG. 21B illustrates another display example in which a mask display area is shown obliquely.

As described above, according to the present embodiment of the present invention, while the imaging apparatus 100 is displaying an image on the display 160 without waiting for completion of recording image data of one frame (or one field into the image memory 140, the apparatus can mask distortion of the image caused by switching between the operation modes of the image sensor.

The embodiment of the present invention is an example for embodying the present invention. Although there is the correspondence between the features of the claims and the specific elements in the embodiment of the present invention, as will be described later, the present invention is not limited to the embodiment. It should be understood by those skilled in the art that various modifications, combinations, sub-combinations and alterations may occur depending on design requirements and other factors insofar as they are within the scope of the appended claims or the equivalents thereof.

The image data supply section 141 corresponds to, for example, image data supply means according to an embodiment of the present invention. The mask data supply section 151 corresponds to, for example, mask data supply means according to the embodiment of the present invention. The imaging instruction accepting section 191 corresponds to, for example, imaging instruction accepting means according to the embodiment of the present invention. The drawing section 152 corresponds to, for example, drawing means according to the embodiment of the present invention.

In addition, each of steps S921, S941, and S951 corresponds to, for example, a step of detecting according to an embodiment of the present invention. Each of step S924, the combination of steps S944 and S945, and the combination of steps S954 and S955 corresponds to, for example, a step of drawing according to the embodiment of the present invention.

Processing steps described in the foregoing embodiment of the present invention may be regarded as a method including those processing steps, a program that allows a computer to execute those processing steps, or a recording medium that stores the program.

What is claimed is:

1. An image display control apparatus comprising:
   image data supply means for supplying an image composed of a plurality of pixels arranged two-dimensionally in a matrix form as captured image data;
   mask data supply means for supplying mask data for masking the image data;
   imaging instruction accepting means for validating an imaging instruction acceptance signal when accepting an operation input corresponding to an imaging instruction; and
   drawing means for sequentially drawing the respective pixels, each having a pixel value, in the image data every predetermined period, wherein
   when detecting that the imaging instruction acceptance signal is valid, the drawing means draws the pixels prior to completion of recording of the image into a memory, where each pixel drawn after the detection and prior to termination of a predetermined time interval has a value including a combination of the image data and the mask data as the pixel value, where a value of the mask data is increased during the predetermined time interval, and each pixel drawn after the detection and after termination of the predetermined time interval has a value including only the mask data, the predetermined interval starting at the detection of the imaging instruction and terminating prior to a period where distortion of the image is determined to occur.

2. The apparatus according to claim 1, wherein when detecting that the imaging instruction acceptance signal is valid, the drawing means draws the pixels having pixel values mixed with the mask data so that the pixel values of the pixels are gradually changed to the mask data during the predetermined segment after the detection.

3. The apparatus according to claim 2, wherein upon displaying a new image after detecting that the imaging instruction acceptance signal is valid, the drawing means draws the mask data as the pixels each having a pixel value.

4. The apparatus according to claim 1, wherein the drawing means performs the detecting operation each time drawing a set of pixels continuously arranged in one direction in the arrangement is finished.

5. The apparatus according to claim 1, wherein the drawing means performs the detecting operation each time drawing one pixel in the arrangement is finished.

6. The apparatus according to claim 1, wherein the drawing means draws the pixels in the vertical direction such that the direction in which the pixels are drawn is the same as the scanning direction on a display surface of a display to be controlled.

7. The apparatus according to claim 1, wherein the mask data contains color information and transmittance.

8. A method for image display control in an image display control apparatus, the method comprising:
supplying, by a signal processing unit, an image composed of a plurality of pixels arranged two-dimensionally in a matrix form as captured image data; supplying mask data for masking the image data; validating an imaging instruction acceptance signal when accepting an operation input corresponding to an imaging instruction; sequentially drawing the respective pixels, each having a pixel value, in the image data every predetermined period;
  detecting that the imaging instruction acceptance signal is valid each time drawing a set of pixels continuously arranged in one direction in the arrangement is finished or each time drawing one pixel in the arrangement is finished; and
  drawing, prior to completion of recording of the image into a memory, the pixels such that each pixel drawn after the detection and prior to termination of a predetermined time interval has a value including a combination of the image data and the mask data as the pixel value, where a value of the mask data is increased during the predetermined time interval, and each pixel drawn after the detection and after termination of the predetermined time interval has a value including only the mask data, the predetermined interval starting at the detection of the imaging instruction and terminating prior to a period where distortion of the image is determined to occur.

9. A non-transitory computer readable storage medium having computer executable instructions stored therein, which when executed by a processor in an imaging apparatus causes the apparatus to execute a method comprising:
supplying an image composed of a plurality of pixels arranged two-dimensionally in a matrix form as captured image data; supplying mask data for masking the image data; validating an imaging instruction acceptance signal when accepting an operation input corresponding to an imaging instruction; sequentially drawing the respective pixels, each having a pixel value, in the image data every predetermined period;
  detecting that the imaging instruction acceptance signal is valid each time drawing a set of pixels continuously arranged in one direction in the arrangement is finished or each time drawing one pixel in the arrangement is finished; and
  drawing, prior to completion of recording of the image into a memory, the pixels such that each pixel drawn after the detection and prior to termination of a predetermined time interval has a value including a combination of the image data and the mask data as the pixel value, where a value of the mask data is increased during the predetermined time interval, and each pixel drawn after the detection and after termination of the predetermined time interval has a value including only the mask data, the predetermined interval starting at the detection of the imaging instruction and terminating prior to a period where distortion of the image is determined to occur.

10. An image display control apparatus comprising:
an image data supply section that supplies an image composed of a plurality of pixels arranged two-dimensionally in a matrix form as captured image data;
a mask data supply section that supplies mask data for masking the image data;
an imaging instruction accepting section that validates an imaging instruction acceptance signal when accepting an operation input corresponding to an imaging instruction; and
a drawing section that sequentially draws the respective pixels, each having a pixel value, in the image data every predetermined period, wherein
when detecting that the imaging instruction acceptance signal is valid, the drawing section draws the pixels prior to completion of recording of the image into a memory, where each pixel drawn after the detection and prior to termination of a predetermined time interval has a value including a combination of the image data and the mask data as the pixel value, where a value of the mask data is increased during the predetermined time interval, and each pixel drawn after the detection and after termination of the predetermined time interval has a value including only the mask data, the predetermined interval starting at the detection of the imaging instruction and terminating prior to a period where distortion of the image is determined to occur.

* * * * *